(12) United States Patent
Grieve

(10) Patent No.: US 6,383,437 B1
(45) Date of Patent: May 7, 2002

(54) ROTATIONAL MOULDING METHOD AND APPARATUS FOR MAKING MULTI COLOR PLASTIC ARTICLES

(76) Inventor: Thomas G. Grieve, 6520 Rico Rd., Wichita, KS (US) 67204

( * ) Notice: Subject to any disclaimer, the term of this patent is extended or adjusted under 35 U.S.C. 154(b) by 0 days.

(21) Appl. No.: 09/409,919
(22) Filed: Sep. 30, 1999
(51) Int. Cl.$^7$ .............................. B29C 39/12; B29B 1/02
(52) U.S. Cl. ..................... 264/246; 264/310; 264/255
(58) Field of Search ................................. 264/246, 247, 264/245, 255, 310, 311

(56) References Cited

U.S. PATENT DOCUMENTS

| | | |
|---|---|---|
| 3,975,480 A | 8/1976 | Walters |
| 4,562,025 A | 12/1985 | Gray |
| 4,610,620 A | 9/1986 | Gray |
| 4,634,360 A | 1/1987 | Gray |
| 4,692,293 A * | 9/1987 | Gray |
| 4,755,333 A | 7/1988 | Gray |
| 4,780,345 A | 10/1988 | Gray |
| 4,894,004 A | 1/1990 | Brault |
| 4,925,151 A | 5/1990 | Gray |
| 5,033,954 A | 7/1991 | Kargarzadeh |
| 5,046,941 A | 9/1991 | Batchelder et al. |
| 5,093,066 A | 3/1992 | Batchelder et al. |
| 5,316,715 A | 5/1994 | Gray |
| 5,354,519 A * | 10/1994 | Kaeser |
| 5,503,780 A * | 4/1996 | Payne |
| 5,648,030 A | 7/1997 | Pemberton et al. |

FOREIGN PATENT DOCUMENTS

JP 05309675 A * 11/1993

\* cited by examiner

Primary Examiner—Jan H. Silbaugh
Assistant Examiner—Geoffrey P. Shipsides
(74) Attorney, Agent, or Firm—Jeffrey L. Thompson; Thompson & Thompson, P.A.

(57) ABSTRACT

An improved rotational molding apparatus and method are provided for rotational molding of plastic articles having differently colored sections. The method and apparatus use a rotational mold having first and second mold shells separated by a removable partition member to form first and second interior spaces within the mold. A thin blade is held against the inner surface of at least one of the mold shells to define a plurality of compartments within the respective interior spaces. Differently colored molding materials, preferably plastic powders, are introduced into each of the compartments and caused to melt against the inner surfaces of the mold shells. The surfaces of the blade and the partition member are kept at a lower temperature than the inner surfaces of the mold shells to prevent the molding materials from melting against the surfaces of the blade and the partition member. The partition member and blade are then removed by separating the first and second mold shells, and additional non-colored, plastic powder is added to the mold. The rotational mold is then closed, heated and rotated to cause the plastic powder to melt against the colored plastic powders on the inner surfaces of the mold shells. The result is a rotationally molded plastic article having controlled placement of differently colored molding materials and a nearly seamless interface between the differently colored sections.

18 Claims, 8 Drawing Sheets

ROTATIONAL MOULDING METHOD AND APPARATUS FOR MAKING MULTI COLOR PLASTIC ARTICLES

BACKGROUND OF THE INVENTION

1. Field of the Invention

The present invention relates generally to methods and apparatus for making molded plastic articles. In particular, the present invention relates to rotational molding methods and apparatus for making multi color plastic articles with controlled placement of differently colored plastic powders.

2. Description of the Related Art

Rotational molding is commonly used to produce hollow plastic articles. Rotational molding is unique among plastic molding processes because the heating, shaping and cooling of the plastic all take place inside the mold without application of pressure. The basic rotational molding process involves placing a predetermined charge of cold plastic powder into a cold mold, which is usually formed of sheet steel or cast aluminum. The mold is then closed and rotated biaxially in a heated oven. As the inner surfaces of the metal mold become hot, the plastic powder tumbling inside the mold starts to melt and coat the inner surface of the mold. When all the powder has melted, the mold is then transferred to a cooled environment. The biaxial rotation typically continues in the cooled environment until the plastic has solidified. At this point, the mold is opened and the molded article is removed.

A wide variety of shapes and sizes of articles can be rotationally molded. However, conventional rotational molding processes are not well suited for producing multi colored articles having uniform wall thickness with abrupt color changes. Such coloring is typically provided by time consuming and expensive post-molding coloring operations, such as painting, silk screening, and the like. Such coloring has also been provided by separately forming different colored sections of an article and then "welding" or melting the different colored sections together. This is also a time consuming and expensive operation and often produces articles of relatively poor quality.

Thus, there is a need in the molded plastics industry for an improved rotational molding apparatus and method that produces nearly seamless multi color articles with abrupt color changes without requiring post-molding coloring operations.

SUMMARY OF THE INVENTION

It is an object of the present invention to provide an improved rotational molding method and apparatus that solve the problems with the conventional rotational molding methods and devices described above.

More specifically, the principal objects of the present invention are to provide a rotational molding method and apparatus that: use controlled placement of multiple pigmented plastic powders to produce multi color articles; produce essentially seamless multi color articles without requiring post-molding coloring operations; can produce open or box-shaped rotationally molded articles having differently colored sections; and produce multi color articles having smooth surfaces and abrupt color changes between differently colored sections.

It is a further object to provide a rotational molding apparatus that is economical to manufacture, efficient in use, capable of a long operating life, and particularly well suited for rotational molding of articles having differently colored sections.

In order to realize the objects and advantages set forth above, the Applicant has developed an improved rotational molding apparatus for rotational molding of plastic articles having differently colored sections. The method and apparatus use a rotational mold having first and second mold shells separated by a removable partition member to form first and second interior spaces within the mold. A thin blade is held against the inner surface of at least one of the mold shells to define a plurality of compartments within the respective interior spaces.

Differently colored molding materials, preferably plastic powders, are introduced into each of the compartments and caused to melt against the inner surfaces of the mold shells by heating and rotating the mold. The surfaces of the blade and the partition member are kept at a lower temperature than the inner surfaces of the mold shells to prevent the molding materials from melting against the surfaces of the blade and the partition member. The partition member and blade are then removed by separating the first and second mold shells, and additional molding material, such as non-colored, translucent plastic powder, is added to the mold. The rotational mold is then closed, and again heated and rotated to cause the additional molding material to melt against the colored molding materials on the inner surfaces of the mold shells. The result is a rotationally molded plastic article having controlled placement of differently colored molding materials and a nearly seamless interface between the differently colored sections.

According to a broad aspect of the present invention, a rotational molding method is provided, comprising the steps of: providing a mold having an interior space defined by an inner surface; separating the interior space into first and second compartments by engaging a blade against the inner surface; introducing a first molding material into the first compartment, the first molding material having a first color; introducing a second molding material into the second compartment, the second molding material having a second color different from the first color; heating and moving the mold to cause the first and second molding materials to melt against the inner surface separately from one another without adhering to the blade; removing the blade from the interior space; introducing a third molding material into the interior space; and heating and moving the mold to cause the third molding material to melt against the first and second molding materials melted against the inner surface.

According to another broad aspect of the present invention, a method of making multi color molded articles is provided, comprising the steps of: providing a mold having first and second separable mold portions each having an inner surface; placing a partition between the first and second separable mold portions to separate a first interior space defined by the inner surface of the first mold portion from a second interior space defined by the inner surface of the second mold portion; introducing a first molding material into the first interior space, the first molding material having a first color; introducing a second molding material into the second interior space, the second molding material having a second color different from the first color; heating and moving the mold to cause the first and second molding materials to melt against the inner surfaces of the first and second mold portions separately from one another without melting against the partition; removing the partition from between the first and second mold portions; introducing a third molding material into the interior spaces defined by the first and second mold portions; placing the first and second mold portions in close peripheral engagement with each other; and heating and moving the mold to cause the third molding material to melt against the first and second molding materials melted against the inner surfaces of the first and second mold portions.

According to yet another broad aspect of the present invention, a rotational molding apparatus is provided, comprising: first and second mold shells each having an inner surface; a partition member adapted to be clamped between the first and second mold shells to form a first interior space on a side of the first mold shell and a second interior space on a side of the second mold shell, the first and second interior spaces being separated from each other by the partition member; and an alignment arrangement for positioning the first and second mold shells in alignment with each other with the partition member therebetween, and for positioning the first and second mold shells in alignment with each other without the partition member therebetween, whereby the partition member can be selectively removed for different molding operations.

The molding apparatus further comprises at least one blade attached to the partition member. The blade is arranged to engage the inner surface of the first mold shell and divide the first interior space into a plurality of compartments for containing different colored molding materials. The blade has a thin edge in engagement with the inner surface of the first mold shell to minimize conductive heat transfer from the first mold shell into the blade and to define an abrupt change of color. The partition member and the blade may be provided with heat sinks to keep the respective surface temperatures of the partition member and the blade substantially below a temperature of the inner surface of the first mold shell.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A rotational molding apparatus and method according to preferred embodiments of the present invention will now be described in detail by reference to FIGS. 1 to 17 of the accompanying drawings.

Figure 1:
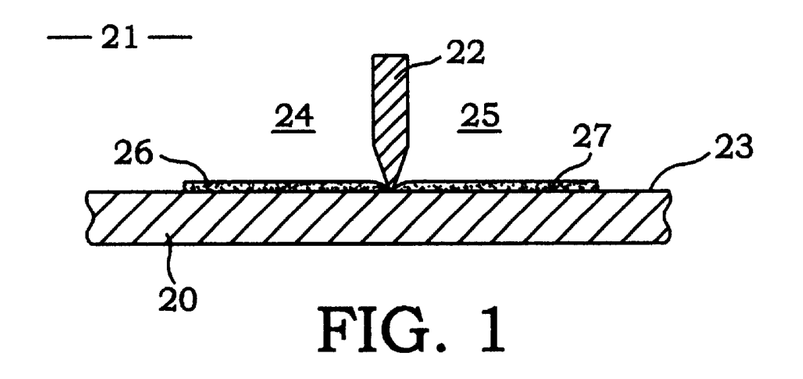
FIG. 1 is a sectional view of a rotational mold having a blade separating two differently colored, melted molding materials according to the present invention.

The basic concept of the rotational molding apparatus and method of the present invention will first be described with reference to FIGS. 1 to 3. The rotational molding apparatus and method use a rotational mold 20 having an interior space 21, and a thin blade 22 held against an inner surface 23 of the mold 20 to separate the interior space 21 into first and second compartments 24, 25. As shown in FIG. 1, a first molding material 26 having a first color is introduced into the first compartment 24, and a second molding material 27 having a second color is introduced into the second compartment 25. The mold 20 is then placed in a heated environment and rotated to cause the molding materials 26, 27 to cascade over and melt against the inner surface 23 of the mold 20 on either side of the blade 22 without melting against or adhering to the surface of the blade 22. The melted molding materials 26, 27 pull back away from the blade 22 as shown.

Figure 2:
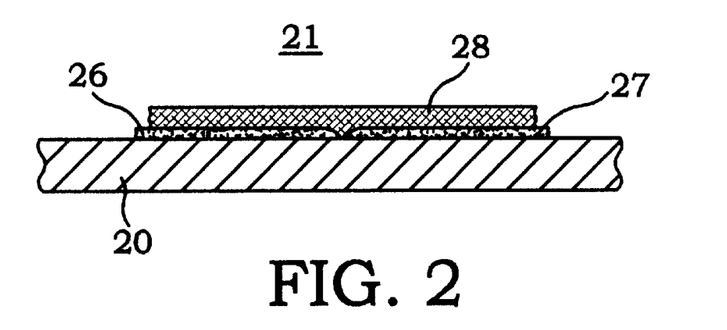
FIG. 2 is a sectional view of the rotational mold shown in FIG. 1 with the blade removed and a layer of translucent molding material applied over the differently colored molding materials.
Figure 3:
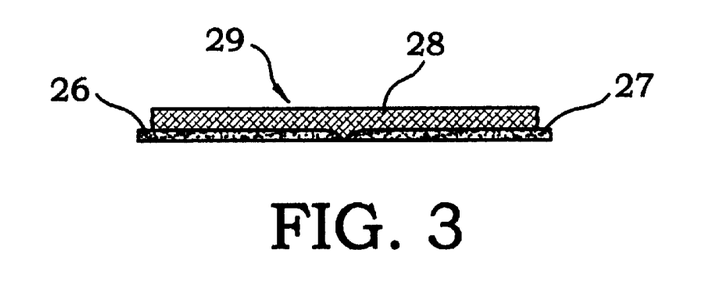
FIG. 3 is a sectional view of a wall of the rotationally molded article made by the present invention.

The blade 22 is then removed from the mold 20, as shown in FIG. 2, and a third molding material 28 is introduced into the interior space 21. The third molding material 28 is preferably white or translucent to enhance the brightness of the colors of the first and second molding materials 26, 27. The mold 20 is again placed in a heated environment and rotated to cause the third molding material 28 to cascade over and melt against the first and second molding materials 26, 27. The molded article 29 is then removed from the mold 20, as shown in FIG. 3. The resulting article 29 has walls with a uniform thickness, an abrupt color change, and a nearly seamless interface between the differently colored sections.

Figure 4:
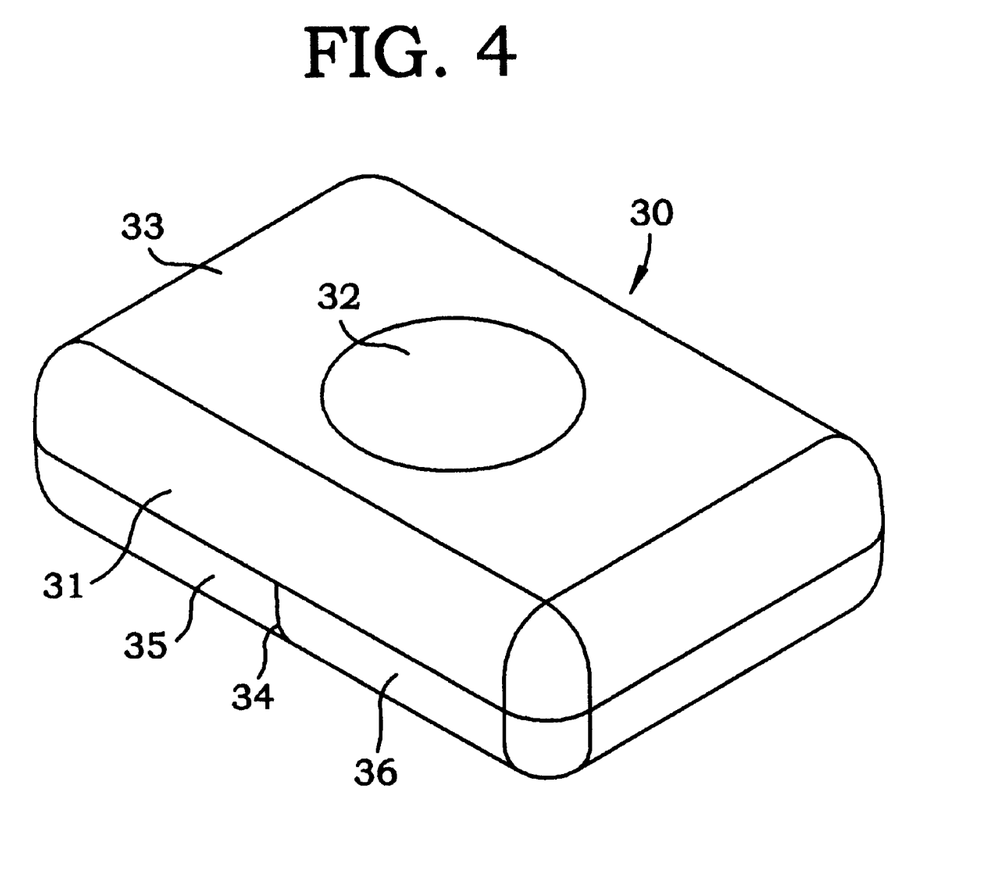
FIG. 4 is a perspective view of the rotationally molded article made by the present invention.

The rotational molding apparatus according to the present invention can be used to produce a hollow molded article 30 having a box-shaped configuration, as shown in FIG. 4. The molded article 30 has an upper half 31 with a circular section 32 surrounded by a differently colored section 33, and a lower half 34 with first and second differently colored side sections 35, 36. The upper and lower halves 31, 34 are integrally molded together, and the differently colored sections 32, 33, 35, 36 are integrally molded together with abrupt color changes and nearly seamless interfaces between the sections.

A rotational molding apparatus 40 for molding the article 30 shown in FIG. 4 will now be described with reference to FIGS. 5 to 17. The apparatus 40 includes a first mold shell 41 and a second mold shell 42 each having respective inner surfaces 43, 44. The mold shells 41, 42 are preferably rigid and have less flexibility than conventional large welded steel rotational molds. Cast or machined aluminum is preferred for the mold shells 41, 42, although copper or nickel electroformed molds are also suitable. Steel plate can be used also if the resultant mold is sufficiently rigid. Depending upon the particular material selected for the mold shells 41, 42, the inner surfaces 43, 44 may require a release agent to be coated thereon before introducing the molding material, or a more permanent non-stick coating applied to the inner surfaces 43, 44. For example, the fluorocarbon material known as TEFLON™ is particularly suitable as a permanent non-stick coating applied to the inner surfaces 43, 44 of cast aluminum mold shells 41, 42.

A partition member 45 is positioned between the first and second mold shells 41, 42 to separate the enclosed interior space defined by the mold shells 41, 42 into a first closed interior space 46 on a side of the first mold shell 41, and a second closed interior space 47 on a side of the second mold shell 42, respectively. The partition 45 totally divides and separates the interior spaces 46, 47 of the mold 40 defined by the first and second mold shells 41, 42.

An alignment arrangement 48 is provided for positioning the first and second mold shells 41, 42 in alignment with each other with or without the partition member 45 therebetween. The alignment arrangement 48 shown in the drawings includes a first pair of bushings 49 extending through a flange 50 of the first mold shell 41, a second pair of bushings 51 extending through a supporting flange 52 surrounding the partition member 45, and a third pair of bushings 53 extending through a flange 54 of the second mold shell 42. The first and second pairs of bushings 49, 51 are each provided with respective bores 49b, 51b, and the second and third pairs of bushings are each provided with respective pins 51p, 53p for insertion into the bores 49b, 51b. Snap rings 49r, 51r, 53r are provided to retain the bushings 49, 51, 53 in place within the first mold shell 41, the partition member 45, and the second mold shell 42, respectively.

The bushings 49, 51, 53 are aligned with each other when the first and second mold shells 41, 42 and the partition member 45 are assembled together properly. In this case, the pins 51p, 53p of the bushings 51, 52 are received into the bores 49b, 51b of the bushings 49, 51, respectively. When the partition member 45 is removed, the first and third pairs of bushings 49, 53 are aligned with each other when the first and second mold shells 41, 42 are assembled together. In this case, the pins 53p of the bushings 53 are received into the bores 49b of the bushings 49. Thus, the bushings 49, 53 in the first and second mold shells 41, 42 can be assembled together with each other directly when the partition member 45 is removed, or assembled together with the bushings 51 in the partition member 45 when the partition member 45 is positioned between the first and second mold shells 41, 42.

The alignment arrangement 48 is not limited to the exact construction shown in the drawings. For example, other arrangements of alignment devices or clamping mechanisms can be used to achieve satisfactory results. Further, spring loaded balls with corresponding grooves (not shown) in the alignment arrangement 48 or separate clamping mechanisms (not shown) can be used to hold the first and second mold shells 41, 42 together.

The supporting flange 52 surrounding the partition member 45 has an inner wall 55 facing an outer edge 56 of the partition member 45. A raised projection 57 extends around the inner wall 55 of the supporting flange 52 and projects toward the outer edge 56 of the partition member 45. The raised projection 57 engages and centers the partition member 45 within the mold 40, and also minimizes the conductive heat transfer between the supporting flange 52 and the partition member 45. An outer periphery 58 of the supporting flange 52 extends outwardly of the first and second mold shells 41, 42 when the supporting flange 52 is clamped between the flanges 50, 54 of the mold shells 41, 42. Pairs of clamping plates 59 are secured on either side of the supporting flange 52 by threaded fasteners 60 to clamp the partition member 45 into an aligned position with the raised projection 57 engaging the outer edge 56 of the partition member 45.

Figure 13:
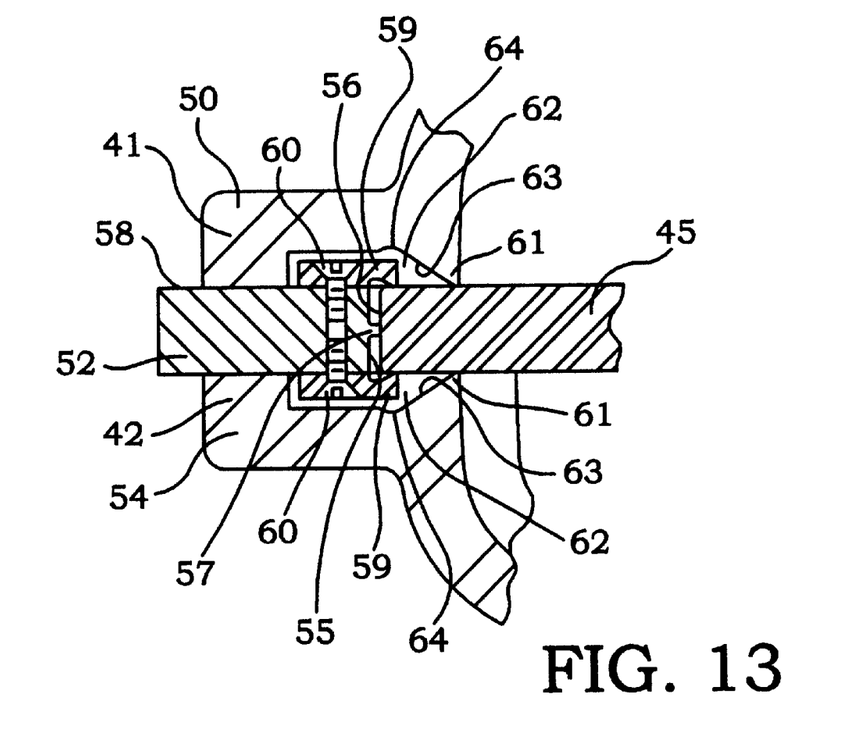
FIG. 13 is an enlarged sectional view of an interface between the top and bottom halves of the mold assembly and a partition plate according to a first embodiment of the present invention.
Figure 14:
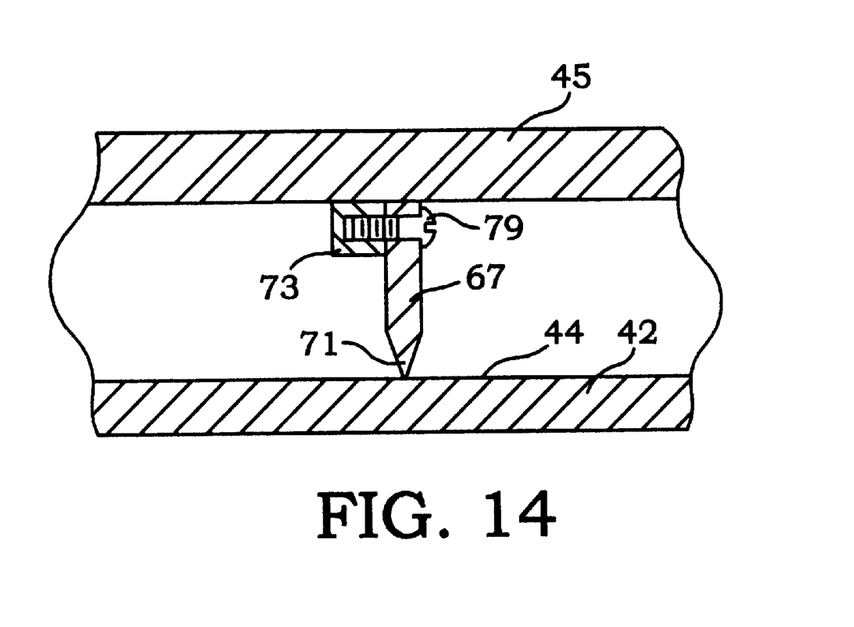
FIG. 14 is an enlarged sectional view of an interface between the blade on one side of the partition plate and the bottom half of the mold assembly.

The mold shells 41, 42 each have an edge 61 extending around a respective perimeter thereof for engaging the partition member 45, and a groove 62 adjacent the edge 61. The groove 62 has a tapered side 63 extending from a bottom 64 of the groove 62 toward the edge 61, as shown in FIG. 13. This construction minimizes conductive heat transfer between the mold shells 41, 42 and the partition member 45 while concentrating sufficient heat at the tip of the mold shells 41, 42 to melt the molding materials. The groove 62 has enlarged portions 65 on respective sides of the mold shells 41, 42 to accommodate the clamping plates 59 secured to the supporting flange 52.

Figure 5:
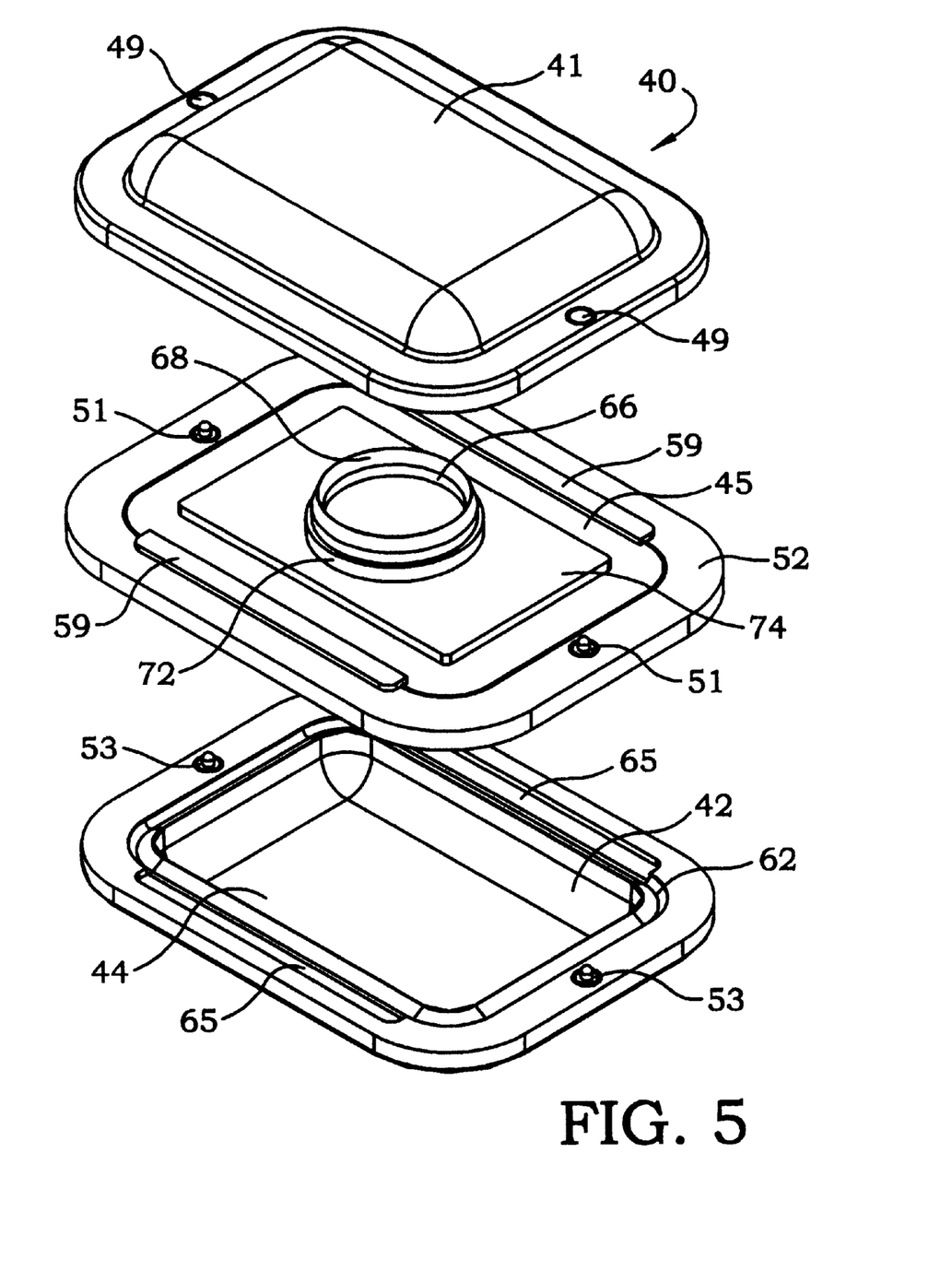
FIG. 5 is an exploded top perspective view of a rotational mold assembly according to the present invention.
Figure 6:
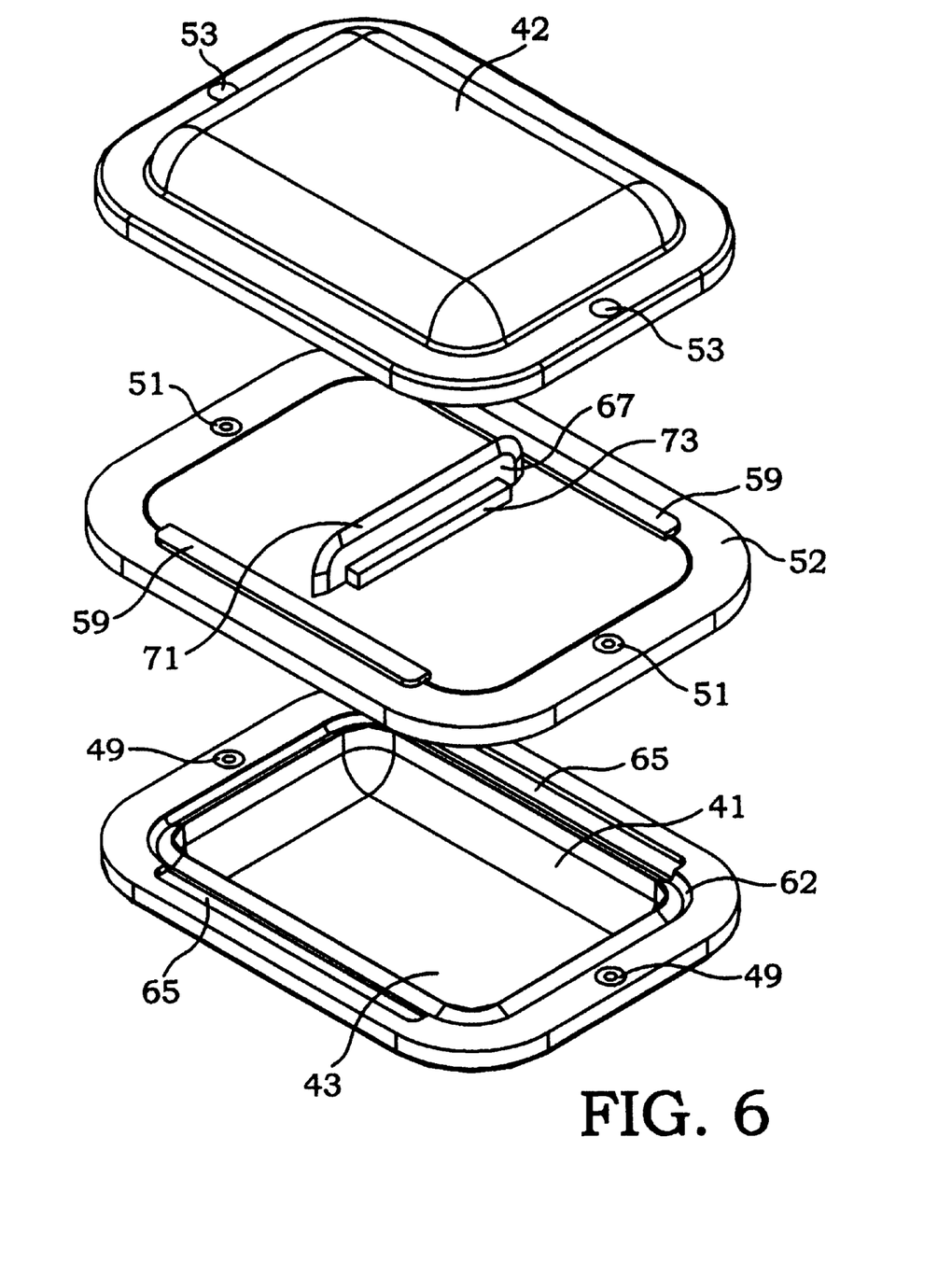
FIG. 6 is an exploded bottom perspective view of the rotational mold assembly shown in FIG. 5.

First and second blades 66, 67 further subdivide the interior spaces 46, 47 of the mold defined by the first and second mold shells 41, 42. As shown in FIG. 5, the first blade 66 has a generally circular, thin edge 68 that engages the inner surface 43 of the first mold shell 41. The first blade 66 divides the interior space 46 defined by the first mold shell 41 into a generally circular center portion 69 and a concentric outer portion 70 surrounding the center portion 69. As shown in FIG. 6, the second blade 67 has a generally straight, thin edge 71 that extends across and engages the inner surface 44 of the second mold shell 42. The second blade 67 divides the interior space 47 defined by the second mold shell 42 substantially in half. The configuration of the blades 66, 67 or additional blades can be modified to define various shapes other than the circular and straight shapes shown in the drawings.

The blades 66, 67 have thin edges 68, 71 in engagement with the inner surfaces 43, 44 of the first and second mold shells 41, 42 to minimize conductive heat transfer from the first and second mold shells 41, 42 to the blades 66, 67 and also to define an abrupt change of color. The thin edges 68, 71 of the blades 66, 67 are preferably formed by even tapering on both sides of each blade 66, 67 to provide a more seamless and uniform interface between the different sections 32, 33, 35, 36 of the molded article 30.

An important feature of the molding apparatus of the present invention is that the partition member 45 and the blades 66, 67 are constructed and arranged such that the surface temperatures of the partition member 45 and the blades 66, 67 rise slower than the temperatures of the inner surfaces 43, 44 of the first and second mold shells 41, 42. This is important because it keeps the molding materials from melting against the surfaces of the partition member 45 and the blades 66, 67 so that a clean and abrupt seam can be provided between the molded sections on each side of the blades 66, 67 and partition member 45. The ideal interface between the molded sections is provided by having a first molded layer that tapers slightly toward the tip of the blades 66, 67 without actually melting against the surface of the blades 66, 67, as shown by reference to the blade 22 in FIG. 1. This allows the blades 66, 67 to be removed from the molding apparatus 40 immediately following the first melting stage without disrupting the first molded layer and without stringing molten strands of the molding material along with the blades 66, 67.

The temperature of the blades 66, 67 and the partition member 45 can be controlled, in some applications, by attaching heat sinks 72, 73 to each of the blades 66, 67 and a heat sink 74 to the partition member 45. The thicknesses of the partition member 45, the blades 66, 67, and the color layer desired, and other variables in a particular molding process will determine whether heat sinks are necessary. The heat sinks 72, 73, 74 are preferably composed of metal plates, preferably aluminum, and are fixedly attached to the partition member 45 and the blades 66, 67 using suitable fasteners, such as threaded screws and the like. The metal plates forming the heat sinks 72, 73, 74 also function to make the partition member 45 more rigid and to facilitate attaching the blades 66, 67 to the partition member 45. The heat sink 72, which is formed as a band, also helps maintain a desired shape of the blade 66 (e.g., circular) after the molding apparatus is assembled.

Figure 7:
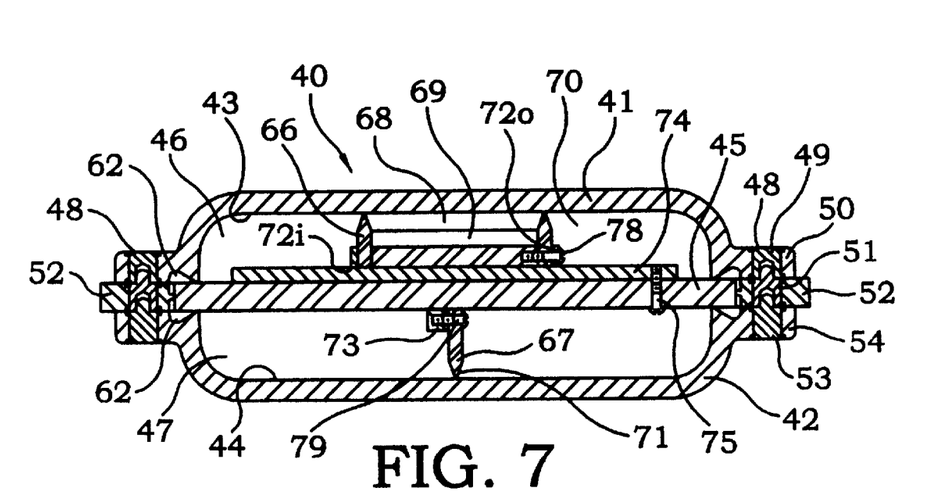
FIG. 7 is a sectional front view of the rotational mold assembly with blades and a partition plate positioned therein.
Figure 8:
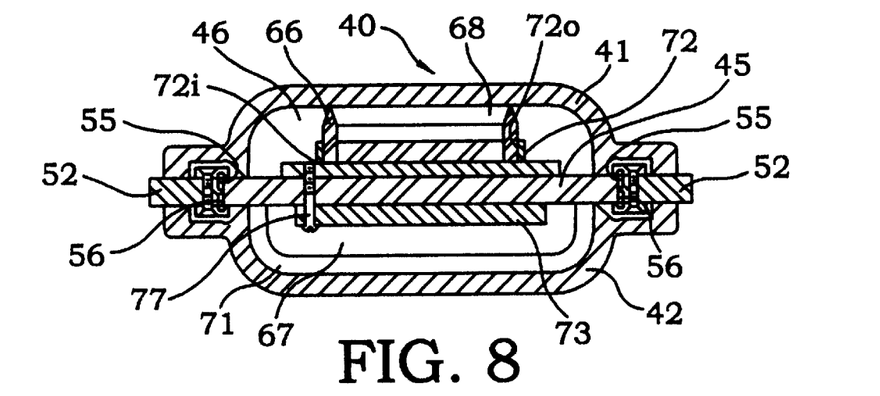
FIG. 8 is a sectional side view of the rotational mold assembly shown in FIG. 7.
Figure 9:
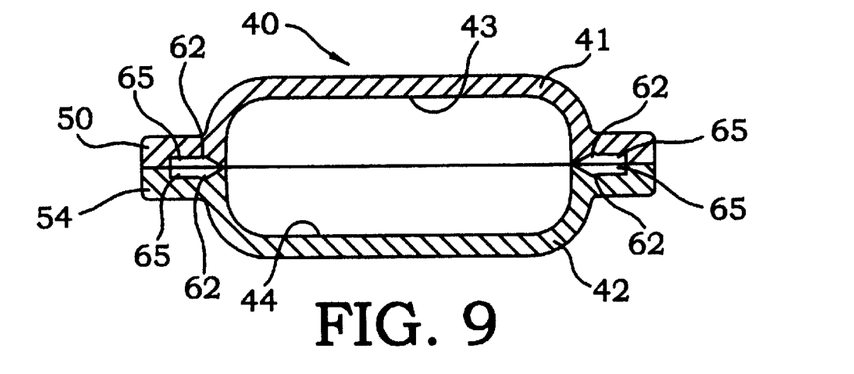
FIG. 9 is a sectional side view of the rotational mold assembly with the blades and partition plate removed.
Figure 10:
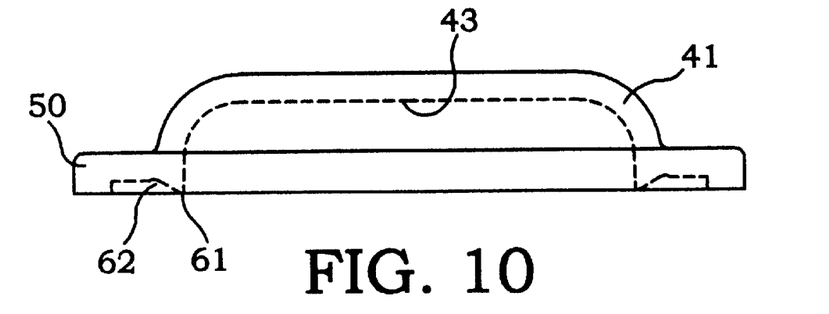
FIG. 10 is a front view of the top half of the mold assembly.
Figure 11:
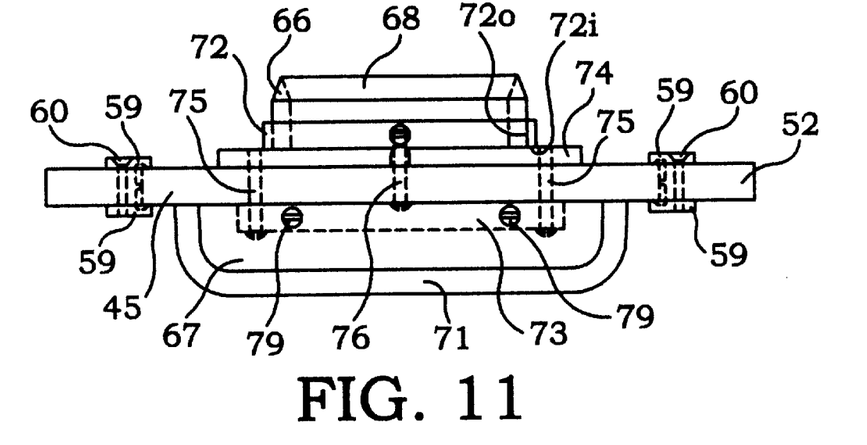
FIG. 11 is a front view of the blade and partition plate of the mold assembly.
Figure 12:
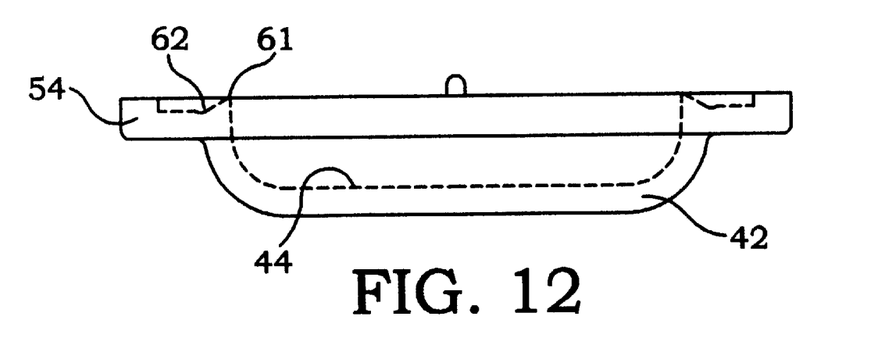
FIG. 12 is a front view of the bottom half of the mold assembly.

As shown in FIGS. 7, 8 and 11, the heat sink 74 for the partition member 45 is secured to the partition member 45 using threaded fasteners 75, an inner portion 72$i$ of the heat sink 72 for the first blade 66 is secured to the heat sink 74 for the partition member 45 using threaded fasteners 76, and the heat sink 73 for the second blade 67 is secured to the partition member 45 using threaded fasteners 77. The first blade 66, in turn, is secured to an outer portion 72$o$ of its respective heat sink 72 using threaded fasteners 78, and the second blade 67 is secured to its respective heat sink 73 using threaded fasteners 79. The heat sinks 72, 73, 74 engage a relatively large surface area of the blades 66, 67 and the partition member 45 to promote conductive heat transfer therebetween. The heat sinks 72, 73, 74, when used for a particular application, function to absorb heat transferred to the blades 66, 67 and the partition member 45 to ensure that the surface temperatures of the blades 66, 67 and the partition member 45 rise slower than the temperatures of the inner surfaces 43, 44 of the mold shells 41, 42. If heat sinks are not required, a fluorocarbon material, such as TEFLON™, can be used for the blocks which attach the blades to the partition member 45.

The blades 66, 67 and partition member 45 are preferably made of a material having a higher coefficient of expansion than the mold shells 41, 42. When the molding apparatus 40 is placed in a heated environment, the mold shells 41, 42 increase to a higher temperature than the temperature of the blades 66, 67. If the blades 66, 67 are made of the same material as the mold shells 41, 42, the mold shells will tend to undergo more heat expansion than the blades 66, 67, thereby causing the inner surfaces 43, 44 of the mold shells 41, 42 to move out of contact with the thin edges 68, 71 of the blades 66, 67. By making the blades 66, 67 and partition member 45 of a material having a higher coefficient of expansion than the mold shells 41, 42, the blades 66, 67 undergo sufficient expansion even at lower temperatures to keep the blades 66, 67 in engagement with the inner surfaces 43, 44 of the mold shells 41, 42.

Other arrangements for keeping the blades 66, 67 in contact with the inner surfaces 43, 44 of the mold shells 41, 42 are contemplated. For example, a compression spring may be positioned between the partition member 45 and the blade to bias the blade away from the partition member 45 and into engagement with the inner surfaces 43, 44 of the mold shells 41, 42. Alternatively, one or more magnets (e.g., electromagnets that can be turned on and off) can be used to pull the blades toward the inner surface of the mold shell. For example, the magnets can be positioned on the blades in such a manner that the magnets pull the blades toward the steel surfaces of the mold shells 41, 42. The use of magnets to pull the blades toward the mold shells is particularly suitable for use with large molds constructed of steel plates.

The optimum thickness of the blades 66, 67 depends upon the particular mold conditions. For example, a blade thickness that is too large may result in inadequate heating and expansion of the blade, thereby causing the blade edge to separate from the inner surface of the respective mold shell during the color layer cycle.

The partition member 45 and the blades 66, 67 are preferably made of a material that thermally expands faster than the mold shells 41, 42, that does not scratch the inner surfaces 43, 44 of the mold shells 41, 42, that withstands the temperatures encountered during molding operations, that is rigid enough for the intended purpose, that has good heat insulating properties, that does not push against the mold shells 41, 42 too hard during heating, and that does not require a release agent to be applied. The fluorocarbon material known as TEFLON™ is particularly suitable for the partition member 45 and the blades 66, 67. Some of the suitable fluorocarbon materials include polytetrafluoroethylene (PTFE or TFE), perfluoroalkoxy (PFA), fluorinated ethylenepropylene (FEP), and polyvinylidenefluoride ($PVF_2$ or PVDF). Many other types of material are also suitable for some applications, including, for example, silicone and phenolic.

Figure 15:
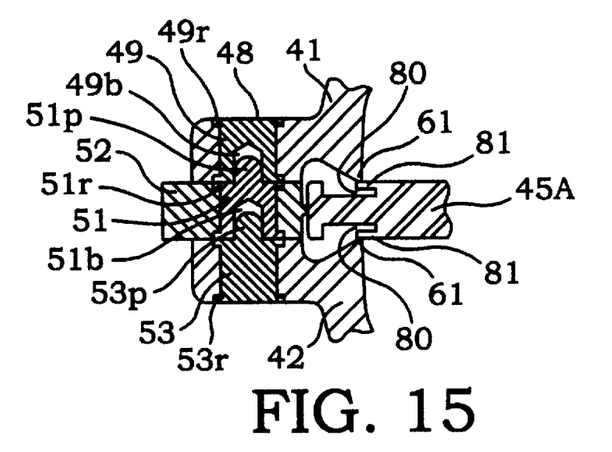
FIG. 15 is an enlarged sectional view of an interface between the top and bottom halves of the mold assembly and a partition plate according to a second embodiment of the present invention.
Figure 16:
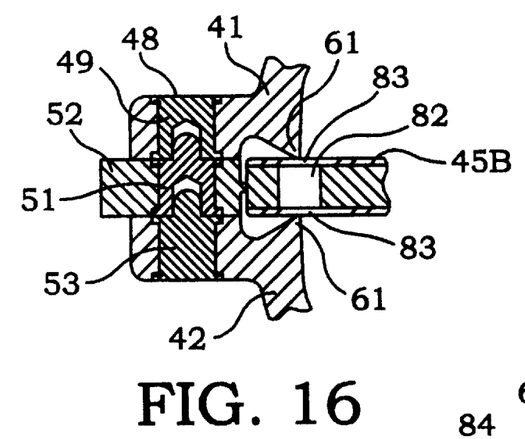
FIG. 16 is an enlarged sectional view of an interface between the top and bottom halves of the mold assembly and a partition plate according to a third embodiment of the present invention.
Figure 17:
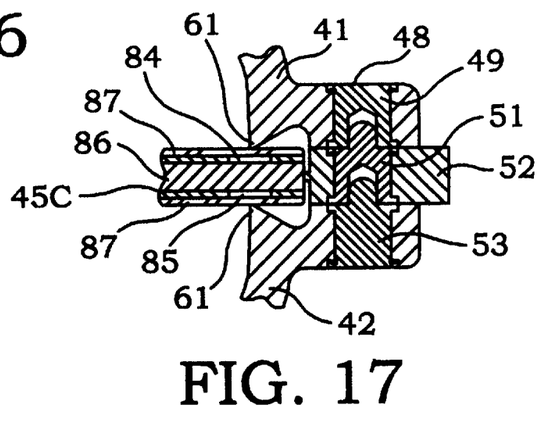
FIG. 17 is an enlarged sectional view of an interface between the top and bottom halves of the mold assembly and a partition plate according to a fourth embodiment of the present invention.

The conductive heat transfer between the edges 61 of the mold shells 41, 42 and the partition member 45 can be further limited by providing an air gap within the partition member 45. FIGS. 15 to 17 show various embodiments of partition members having air gaps designed to limit conductive heat transfer from the mold shells 41, 42 into the partition member 45. The partition member 45A shown in FIG. 15 has machined gaps 80 provided beneath the surfaces 81 of the partition member 45A engaged by the edges 61 of the mold shells 41, 42. The machined gaps 80 function to limit heat transfer into the partition member 45A from the mold shells 41, 42.

Similarly, the partition member 45B shown in FIG. 16 has an air gap 82 sandwiched between the outer layers 83 of the partition member 45B. The partition member 45C shown in FIG. 17 has first and second air gaps 84, 85 formed between an inner layer 86 of the partition member 45C and the respective outer layers 87. The air gaps in each of these embodiments function to limit the heat transfer from the mold shells 41, 42 to the surfaces of the partition member 45A–45C exposed to the molding materials contained within the molding apparatus 40. The particular construction of the partition member 45 will depend upon the other components of the molding apparatus 40, the molding materials to be used, and the other parameters of a given molding process.

In use, differently colored molding materials are placed within the interior spaces 46, 47 of the molding apparatus 40 defined by the inner surfaces 43, 44 of the mold shells 41, 42 and the surfaces of the partition member 45 and the blades 66, 67. The mold shells 41, 42 are then aligned and clamped together with the help of the alignment arrangement 48, and the entire molding apparatus 40 is placed into a heated environment. Rotating means are provided for slowly rotating the molding apparatus 40 around two axes of rotation within the heated environment in a conventional manner.

Conductive heat transfer from the heated environment causes the inner surfaces 43, 44 of the mold shells 41, 42 to rise in temperature. As a result of the rotation motion of the molding apparatus 40, the differently colored molding materials within the interior spaces 46, 47 cascade over the inner surfaces 43, 44 of such spaces, and the molding materials melt against the inner surfaces 43, 44 of the mold shells 41, 42. The molding apparatus 40 is removed from the heated environment after the molding materials melt against the inner surfaces 43, 44 of the mold shells 41, 42 and before the surfaces of the partition member 45 or the blades 66, 67 reach a temperature high enough to melt the molding materials. Because the surfaces of the partition member 45 and the blades 66, 67 rise in temperature more slowly than the inner surfaces 43, 44 of the mold shells 41, 42, the temperature and heating time in the heated environment can be adjusted to keep the molding materials from melting against or adhering to the partition member 45 and blades 66, 67.

After the colored molding materials have melted against the inner surfaces 43, 44 of the mold shells 41, 42 (and before the colored molding materials melt against or adhere to the surfaces of the partition member 45 or blades 66, 67), the molding apparatus 40 is removed from the heated environment. A thinner application of the colored layer at this stage will result in brighter colors and a more nearly seamless article 30 at the end of the molding process.

The mold shells 41, 42 are then unclamped and the partition member 45 and blades 66, 67 are removed. A mechanical means may be provided to keep the partition member 45 and blades 66, 67 in alignment with the mold shells 41, 42 as they are being removed to minimize distortion in the edges of the colors and damage to the blades 66, 67. A white or translucent (clear) molding material is then poured into the interior space of the mold and the mold shells 41, 42 are reclamped together without the partition member 45 and blades 66, 67 therebetween. If the colored layer is made sufficiently thick, a colored molding material can be used at this time with only minimal darkening of the intended outside colors. Preferably, the removal of the partition member 45 and the blades 66, 67 takes place quickly so that the mold shells 41, 42 are not allowed to cool significantly.

After reclamping the mold shells 41, 42 together without the partition member 45 therebetween, the molding apparatus 40 is reintroduced into the heated environment for continued rotational molding. Upon such continued rotational molding, the white or translucent molding material cascades over and melts against the inner surfaces 43, 44 of the previously formed layer of colored molding material to form a continuous white or translucent layer underlying the colored molding material. The end result is a box-shaped article 30 formed by rotational molding that has a plurality of integral, differently colored sections 32, 33, 35, 36.

The particular molding materials used in the present invention generally include all powdered materials suitable for rotational molding processes. For example, polyethelenes and other thermoplastics suitable for rotational molding may be used in the present invention with various pigments added for coloring.

Although the inside layer of molding material is described as being white or translucent, other colors or types of molding materials can also be used without departing from the present invention. The color of the molding material used for the inner layer, as well as the particular additives and fillers used, will depend on the thickness of the outer colored layer and the color and physical properties desired in the finished article.

As used in this application, the term "color" includes clear or translucent properties as well as other colors and color combinations. For example, clear may be a color chosen for certain sections of a molded article. This would facilitate making windows for parts when used with a clear inside layer.

When a window is desired in a molded article, the area of the window may or may not be coated with the initial layer, depending on how consistent the wall thickness needs to be maintained in the final article. The wall thickness will be more consistent and uniform if the area of the window is coated with an initial clear layer of plastic before applying the clear inside layer.

The rotational molding apparatus 40 described above has several additional uses other than the basic molding process described above. For example, by using a partition member 45 without the blades 66, 67 attached and then removing it for the second stage molding, a two-color article with colors meeting at the edges of the mold shells 41, 42 can be formed. Further, by inserting a partition member 45 without the blades 66, 67 attached after the first color layer has been formed and running the second cycle (i.e., forming the inner layer) this way, two open shells with multiple colors can be obtained. Further, by using a partition member 45 without the blades 66, 67 attached, two single color open shells with the same or different colors can be obtained with a single rotational molding cycle. Further, by not placing any powder in one of the interior spaces 46, 47 of the molding apparatus 40, a single article having an open shell construction with or without multiple colors can be obtained.

The molding apparatus can also be constructed with multiple cavities built individually and mounted on the same side or on each side of an arm of a rotational molding machine or, for smaller parts, a partition member 45 with or without blades 66, 67 designed to function with all cavities at once may be used. The molding apparatus can also be used, in some applications, with wider blades or two thin blades with a space therebetween to create a distinct border between colors or to create text or other designs on the outer layer.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. A method of making hollow multi color molded articles, comprising the steps of:

providing a mold having two separable portions which are useable together to define an enclosed interior space;

placing a partition between the two separable portions to divide said enclosed interior space into first and second interior spaces;

separating at least one of said first and second interior spaces into first and second compartments by engaging a blade against an inner surface of a respective one of said mold portions;

introducing a first molding material into said first compartment, said first molding material having a first color;

introducing a second molding material into said second compartment, said second molding material having a second color different from said first color;

heating and moving said mold to cause said first and second molding materials to melt against said inner surface separately from one another without adhering to said blade;

removing said blade and said partition from said enclosed interior space;

introducing a third molding material into said enclosed interior space;

heating and moving said mold to cause said third molding material to melt against exposed inner surfaces of the first and second molding materials and the mold portions to form a hollow molded article; and removing said first and second mold portions from the hollow molded article after the third molding material cools and solidifies.

2. The method according to claim 1, wherein said steps of moving said mold comprise rotating said mold around two axes of rotation.

3. The method according to claim 1, wherein said third molding material is a white or noncolored, translucent molding material.

4. The method according to claim 1, wherein said first, second and third molding materials are plastic powders.

5. The method according to claim 1, wherein said mold is made of metal and said heating steps comprise placing said mold in a heated environment and raising a temperature of said inner surface sufficiently to cause said molding materials to melt against said inner surface.

6. The method according to claim 1, wherein said blade is made of a material with a higher coefficient of expansion than said mold to keep said blade in engagement with said inner surface during said heating step.

7. The method according to claim 1, further comprising the step of providing said blade with a heat sink to keep a surface temperature of said blade below a melting temperature of said molding materials.

8. The method according to claim 1, further comprising the step of providing said blade with a thin edge for engaging said inner surface to cause an abrupt color change.

9. The method according to claim 1, wherein a shallow V-shaped notch is formed between the first and second molding materials upon removal of the blade, and said third molding material creates a continuous layer that forms a seam between the first and second molding materials with abrupt color changes.

10. The method according to claim 1, wherein only predetermined amounts of said molding materials are introduced into the mold such that all of the molding materials introduced are melted into thin even layers of the molded article.

11. A method of making hollow multi color molded articles, comprising the steps of:

providing a mold having it and second separable mold portions each having an inner surface, said mold portions being useable together to define an enclosed interior space;

placing a partition between said first and second separable mold portions to separate a first interior space defined by the inner surface of said first mold portion from a second interior space defined by the inner surface of said second mold portion;

separating at least one of said interior spaces into multiple compartments by engaging a blade attached to said partition with an inner surface of a respective one of said mold portions;

introducing first molding materials into each of said multiple compartments of said first interior space, said first molding materials each having a different color;

introducing a second molding material into said second interior space;

heating and moving said mold to cause said first and second molding materials to melt against the inner surfaces of said first and second mold portions separately from one another without melting against said partition or said blade;

removing said partition and said blade from between said first and second mold portions;

introducing a third molding material into the interior spaces defined by said first and second mold portions;

placing said first and second mold portions in close peripheral engagement with each other such that the inner surfaces thereof define said enclosed interior space;

heating and moving said mold to cause said third molding material to melt against the first and second molding materials melted against the inner surfaces of the first and second mold portions to form a hollow molded article; and removing said first and second mold portions from the hollow molded article after the third molding material cools and solidifies.

12. The method according to claim 11, wherein said steps of moving said mold comprise rotating said mold around two axes of rotation.

13. The method according to claim 11, wherein said third molding material is a white or noncolored, translucent molding material.

14. The method according to claim 11, wherein said first, second and third molding materials are plastic powders.

15. The method according to claim 11, further comprising the step of providing said partition with a heat sink to keep a surface temperature of said partition below a melting temperature of said molding materials.

16. The method according to claim 11, further comprising the step of providing said mold portions with a thin contact area for engaging said partition to minimize conductive heat transfer from said mold portions to said partition.

17. The method according to claim 11, wherein only predetermined amounts of said molding materials are introduced into the mold such that all of the molding materials introduced are melted into thin even layers of the molded article.

18. The method according to claim 11, wherein said mold is made of metal and said heating steps comprise placing said mold in a heated environment and raising a temperature of said inner surface sufficiently to cause said molding materials to melt against said inner surface.

* * * * *